W. R. CLARK.
METHOD OF AND MEANS FOR MELTING BRASS AND SIMILAR SCRAP.
APPLICATION FILED JUNE 13, 1918.
1,328,714.
Patented Jan. 20, 1920.
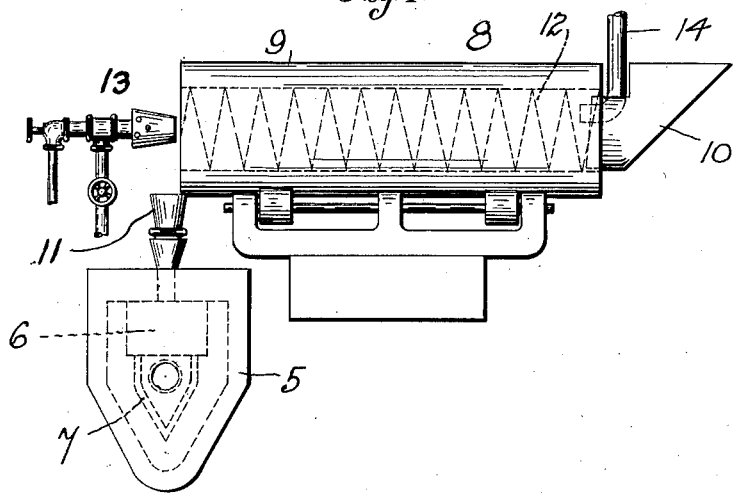
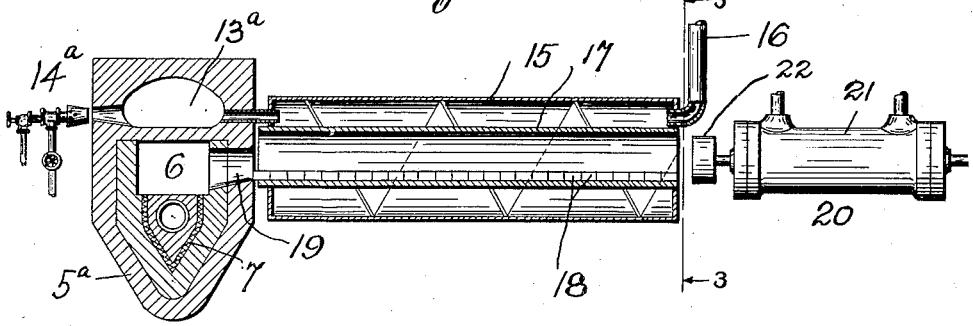
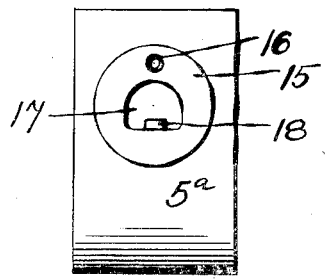
Inventor
Walter R. Clark,
By
Attorney

UNITED STATES PATENT OFFICE.

WALTER R. CLARK, OF BRIDGEPORT, CONNECTICUT, ASSIGNOR TO BRIDGEPORT BRASS COMPANY, OF BRIDGEPORT, CONNECTICUT, A CORPORATION OF CONNECTICUT.

METHOD OF AND MEANS FOR MELTING BRASS AND SIMILAR SCRAP.

1,328,714.   Specification of Letters Patent.   Patented Jan. 20, 1920.

Application filed June 13, 1918. Serial No. 239,742.

*To all whom it may concern:*

Be it known that I, WALTER R. CLARK, a citizen of the United States, residing in Bridgeport, in the county of Fairfield and State of Connecticut, have invented certain new and useful Improvements in Methods of and Means for Melting Brass and Similar Scrap, of which the following is a full, clear, and exact description.

In the melting of brass and similar scrap, very satisfactory results can be produced, generally speaking, by the use of electric furnaces of the induction type, where a secondary, consisting of a part of the molten metal of the charge, is located adjacent the bottom of or below the main body of the charge or bath, and so arranged as to promote the circulation of the bath by motor effect. It has been found, however, that the cost of melting metal in a furnace of this kind is rather high and that, furthermore, it is desirable to reduce the length of time commonly necessitated for bringing the scrap up to the required high temperature in the furnace chamber.

The primary object of my present invention is to provide an improved method for melting brass and similar scrap, involving a preliminary heating of the scrap before it is fed into the electric furnace. The preliminary heating imparted to the scrap may be produced more economically than that of the furnace, as an ordinary oil burner, for example, will fulfil the required conditions of preliminary heating, and as a result, the operation of the melting apparatus as a whole may be carried out more efficiently and economically than in the case where the entire heating effect is produced from the furnace itself.

Another object of my invention is to provide improved means for melting brass and similar scrap, wherein the preheating device includes or has associated with it a device for mechanically charging the electric furnace. The preheating is preferably done while the metal to be melted is slowly advanced toward the furnace chamber. The metal can be properly fed during the preheating whether it is in the form of small shavings, chips or dust, or is in the form of briquets or cabbages.

To these and other ends, the invention consists in the novel features and steps and combinations of parts to be hereinafter described and claimed.

In the accompanying drawing,

Figure 1 is a diagrammatic side elevation of apparatus for carrying out the invention;

Fig. 2 is a vertical longitudinal section of a modified form of apparatus; and

Fig. 3 is a section on line 3—3 of Fig. 2.

In the practice of my invention, I prefer to use as the main melting means an electric induction furnace of the type wherein a secondary of molten metal is located beneath the body part of the charge or bath and in communication therewith, the arrangement of the channel and furnace body being such that the metal in the bath is circulated by motor effect produced in the channel.

In the drawing, I have shown diagrammatically a furnace of this character, having a body 5 and an interior chamber or hearth 6. The secondary channel beneath the chamber 6 is indicated at 7. The primary core and winding of the transformer are omitted from the drawing. The preheating device shown in Fig. 1 is denoted generally by reference numeral 8, and comprises a rotating drum or furnace body 9, through which the material to be melted is passed before it is introduced into the chamber 6 of the electric furnace. In the form shown, the rotary furnace 9 is provided at one end with a feed hopper 10 into which the scrap is introduced, and at the opposite end of the drum 9 the latter discharges into a funnel 11 at the top of the electric furnace leading to the top of the furnace chamber 6. In practice, the drum 9 will be very slightly tilted so that the scrap metal which, in this instance, will be in the form of rather fine shavings, turnings or dust, will gradually move from right to left, while moving around with the drum and taking a circuitous course therein, owing to the provision of spiral vanes or the like in the interior of the drum, as indicated by the dotted lines 12. At the discharge end of the drum, an oil burner 13 is arranged to throw a flame into the interior of the drum and to thereby heat the material passing through the drum on its way to the induction furnace. The products of combustion pass out of the drum through a stack 14 at the feeding end.

It will be understood from the foregoing that the scrap to be melted which, in this instance, is rather finely divided, is slowly advanced toward the induction furnace so that the furnace chamber 6 is gradually filled. The electric furnace can be placed in operation as soon as the first part of the charge enters the chamber and can remain in continuous operation throughout the feeding in of the charge through the preheating device. While the metal is being slowly progressed toward the furnace, it is very effectively heated by the flame from the oil burner 13 and by the time it reaches the chamber of the electric furnace, the metal will have had a considerable degree of heat imparted thereto, whereby the electric current necessitated for heating the charge in the electric furnace is considerably reduced in amount. While the oil burner, for example, would not be a satisfactory means for raising the metal to the melting point, it does form an efficient and economical means for preheating, and as the cost of raising the metal to the preheating heat is considerably less in the apparatus described than it is where all the heat is produced by the electric furnace, considerable economies of operation are effected. At the same time, as the electric furnace operates simultaneously with the preheating device, the total length of time required for the melting down of the material is appreciably reduced, and the output therefore increased.

In the modification shown in Fig. 2, the general principles of operation are the same, although the apparatus in question is designed primarily for the treatment of scrap which is fed to the electric furnace in the form of briquets or cabbages. In the particular form shown, the retort 13 in the roof of the electric furnace above the furnace chamber 6 is heated by an oil burner 14ª, the products of combustion passing through the muffle 15 and out of the muffle through a stack 16. In the muffle 15 is located a feed tube or chamber 17 through which briquets 18 are gradually progressed toward and through a charge opening 19 of the induction furnace 5ª by means of a feeding device 20, which may comprise a hydraulic cylinder 21 and piston 22. As the briquets are forced slowly through the feed tube or chamber 17, they are heated by the products of combustion circulating about said tube in the muffle 15 and when they enter the electric furnace chamber, they are therefore heated to a moderate temperature.

By providing the heating chamber or retort 13 in the roof of the electric furnace above the furnace body, the charge in said chamber is heated to a moderate degree by downward radiation of heat against the upper surface thereof, as described in my application Serial No. 232,753, and therefore the oil burner or equivalent device serves the double function of maintaining the upper surface of the charge at such a temperature as to prevent chilling or incrustation and of simultaneously preheating the metal which is being fed to the furnace.

It will be understood that the rotary furnace shown in Fig. 1, like the stationary part 15 shown in Fig. 2, is in the nature of a muffle, through which the products of combustion of the burner, or the like, are passed in one direction as the metal to be melted is fed in the other direction. In the form shown in Fig. 1, the muffle itself acts as a feeding device, whereas in the form shown in Fig. 2, a separate feeding device is required.

Various changes may be made in the details of the procedure and furnace construction herein described without departure from the scope of the claims.

I do not claim herein the method of melting brass and similar scrap in the form of loose chips and cuttings, which comprises cabbaging the scrap and then introducing it into an electric furnace, as claimed in my application, Serial No. 247,949; nor do I claim herein the combination with an electric furnace of mechanical means for feeding the same with a succession of briquets of scrap metal, as claimed in that application.

Furthermore, I do not claim herein an electric furnace of the induction type having a secondary below the upper surface of the charge, a roof for the furnace chamber adapted to radiate heat downward, and means above the roof, but within the furnace structure, for heating the roof, including a combustion chamber through which the products of combustion pass without contact with the charge, as claimed in my application Serial No. 322,557, filed September 8, 1919.

What I claim is:

1. The method of melting brass and similar scrap, which comprises advancing the scrap slowly toward and into an electric furnace, and preheating the scrap during such slow advance.

2. The method of melting brass and similar scrap, which comprises progressively advancing a comparatively attenuated body of the scrap slowly toward and into an electric furnace through a path of considerable length, and preheating the scrap during such slow advance substantially throughout the period in which it moves through such path, whereby the scrap is pre-heated to a substantial degree before entering the furnace.

3. The method of melting brass and similar scrap in the form of loose chips and cuttings, which comprises advancing an attenuated and substantially continuous body of the scrap at an approximately uniform slow and gradual rate toward and into an electric furnace through a path of substantial length, and pre-heating the scrap substantially throughout its movement through such path.

4. The method of melting brass and similar scrap in the form of loose chips or cuttings, which comprises advancing an attenuated body of the chips or cuttings into an electric furnace through a heating muffle wherein the scrap is progressed slowly and gradually toward the furnace through a path of considerable length, whereby the scrap is pre-heated to a substantial degree during the time that it is moving toward the furnace.

5. The method of melting brass and similar scrap in an electric induction furnace having a secondary channel below the upper surface of the charge, which comprises advancing an attenuated body of the scrap slowly toward and into the furnace, pre-heating the scrap during such slow advance movement, inducing heating current in the lower part of the charge in the furnace chamber, and heating the upper surface of the charge in said chamber from above.

6. The method of melting brass and similar scrap in an electric induction furnace, having a molten secondary channel below the main body of the charge, which comprises advancing a body of the scrap toward and into the furnace chamber and pre-heating the same during its advance, inducing heating current in the lower part of the charge in the furnace chamber, and heating the upper surface of the charge in the furnace chamber by downward radiation of heat from above to prevent incrustation of the upper surface of the charge.

7. The combination with an electric furnace having a molten secondary below the main body of the charge, of means for heating the upper surface of the charge by downward radiation of heat from above, and means for preheating the material supplied to said furnace.

8. The combination with an electric furnace having a molten secondary beneath the body portion of the charge, of means for feeding brass or similar scrap into the furnace chamber, and means for heating the upper surface of the charge in said chamber by downward radiation of heat.

9. The combination with an electric furnace of the induction type having a molten secondary beneath the body portion of the charge, of means for feeding brass or similar scrap into the furnace chamber, means for preheating said scrap, and means for heating the upper surface of the charge in said chamber by downward radiation of heat from above.

In witness whereof, I have hereunto set my hand, on the 6th day of June, 1918.

WALTER R. CLARK.